United States Patent [19]
Markandey et al.

[11] Patent Number: 5,671,298
[45] Date of Patent: Sep. 23, 1997

[54] IMAGE SCALING USING CUBIC FILTERS

[75] Inventors: Vishal Markandey, Dallas; Robert John Gove; Kazuhiro Ohara, both of Plano; Dennis J. Tobin, Carrollton, all of Tex.

[73] Assignee: Texas Instruments Incorporated, Dallas, Tex.

[21] Appl. No.: 297,999

[22] Filed: Aug. 30, 1994

[51] Int. Cl.$^6$ ............................................. G06K 9/00
[52] U.S. Cl. ................................. 382/298; 382/260
[58] Field of Search ........................... 382/298, 299, 382/300, 232, 236, 235, 238, 243, 260, 261, 262, 263, 264, 270, 272, 273, 274, 275, 308; 348/581; 358/451; 345/127, 128, 129, 130, 121, 122, 152; 395/152, 162, 136

[56] References Cited

U.S. PATENT DOCUMENTS

| | | | |
|---|---|---|---|
| 4,578,812 | 3/1986 | Yui | 382/41 |
| 4,600,919 | 7/1986 | Stern | 340/725 |
| 4,797,836 | 1/1989 | Witek et al. | 364/518 |
| 5,125,043 | 6/1992 | Karlsson | 392/300 |
| 5,131,057 | 7/1992 | Walowit et al. | 382/300 |
| 5,255,085 | 10/1993 | Spence | 358/527 |
| 5,333,069 | 7/1994 | Spence | 358/517 |

FOREIGN PATENT DOCUMENTS

| | | | |
|---|---|---|---|
| WO 90/00780 | 1/1990 | European Pat. Off. | G06K 9/36 |
| WO 90/16034 | 12/1990 | European Pat. Off. | G06F 15/62 |

OTHER PUBLICATIONS

George Wolberg, Digital Image Warping, IEEE Computer Society Press, Los Alamitos, CA, pp. 129–133. no publication date.

*Primary Examiner*—Leo Boudreau
*Assistant Examiner*—Bijan Tadayon
*Attorney, Agent, or Firm*—Robert L. Troike; Leo N. Heiting; Richard L. Donaldson

[57] ABSTRACT

An improved image scaling filter for a video display where a coefficient value for the closest input lines to a given output line that are less than two line lengths from the given output line are determined by cubic interpolation using the line distances. The input lines are multiplied by the coefficient for that line and the multiplied closest input line values are summed to determine the output line value.

3 Claims, 9 Drawing Sheets

IMAGE SCALING USING CUBIC FILTERS

This invention relates to video image processing and more particularly to scaling images for video display.

BACKGROUND OF THE INVENTION

There are many types of video displays and many types of formats for video displays and within the displays themselves there are many modes. For example, for a computer there are VGA, SVGA and XGA displays, all of which have differing numbers of lines and columns. It is often desirable at times to have multi-media presentations with different parts of the screen carrying different images, and, therefore, there is need for changing the number of lines and columns for a given video display. Further, there is a proposed new High Definition TV Standard (HDTV) with as much as 1920 colnmns×1080 lines. Still further, there are in addition to CRT displays, other forms of displays like flat panels. Further, there is another type of device known as a Digital Micromirror Device (DMD), which is a new projection display that utilizes reflections from hundreds of thousands of micromirrors, each functionally mounted above its own memory cell. Within the operation of such a system, it may be desirable to have a panoramic view, a wide screen view, or a movie screen view, again, requiring some modifications of the number of lines of the video signal from a source to the number of lines in the output signal. This is achieved by some form of image scaling.

Figure 1:
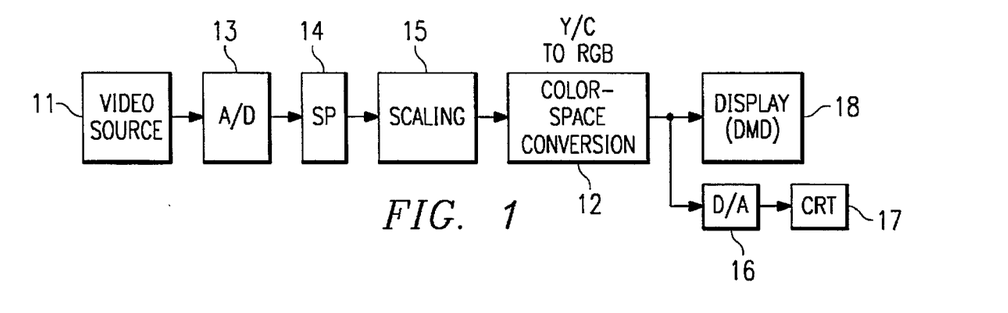
FIG. 1 illustrates a block diagram of a display system.

FIG. 1. illustrates a system wherein there is a video source which may be from a cable, a VCR, camera, or Laser Disk system. The signals are converted from analog to digital format and processed using some form of signal decoding. The inputs may be deinterlaced (option for progressive display) and the resulting signal is then passed into a scaling filter, which is the subject of the invention herein, onto some form of color space network and then applied to a display such as the previously mentioned DMD display or to a digital to analog converter to a conventional CRT display, LCD, or other kind of display. One method in the prior art of image scaling is called the bilinear interpolation method. Bilinear interpolation, while cheap and easy to implement, the picture quality produced can be quite poor as the image detail is softened and there are also aliasing (unwanted pattern) problems. If x(w) is the frequency domain representation of the original signal, then the resampling operation will create a scaled image whose frequency domain representation contains shifted replicas of x(w), located at the new sampling frequency. These replicas can interact with each other if not completely separated from each other, leading to the aliasing. The image softening is caused by the fact that interpolation filters are basically low pass filters with high frequency roll-off.

SUMMARY OF THE INVENTION

In accordance with one embodiment a scaling filter is provided wherein a coefficient value for each closest input picture element (pixel) to an output picture element is determined by cubic interpolation of the distance between the input element to output element. A coefficient value is determined for the closest input elements and the closest input elements are multiplied by the coefficient values and are summed.

DETAILED DESCRIPTION OF PREFERRED EMBODIMENTS OF THE INVENTION

Referring to FIG. 1, the video source 11, which can come from a cable, VCR, or camera, etc., is applied to analog-to-digital (A/D) converter 13, signal processor 14 for decoding and providing luminance signal Y and chrominance signal (I & Q) to scaling filter 15. The signal may or may not be interlaced with two separate fields. The output from the scaling filter 15 is applied through color-space conversion 12, digital-to-analog converter (D/A) 16 to a CRT 17 or flat panel display, or directly to a flat panel or a digital micro mirro device (DMD) device. In some cases, the scaling may be done space conversion. For VGA type inputs, no color-space conversion is used. Scaling may also be performed after signal has been subjected to color space conversion (which converts it from Y/I/Q to R/G/B). Furthermore, scaling may be performed on VGA data which comes in as R/G/B and bypasses the signal encoding, deinterlacing, color space conversion stages. The video signals may also be digital, in which case there is no analog-to-digital conversion. The input signals may also be non-video imagery, such as digital signals from photography or printing devices, and the picture elements from these are to be scaled up (increasing picture size/or down (decreasing picture size).

Figure 2:
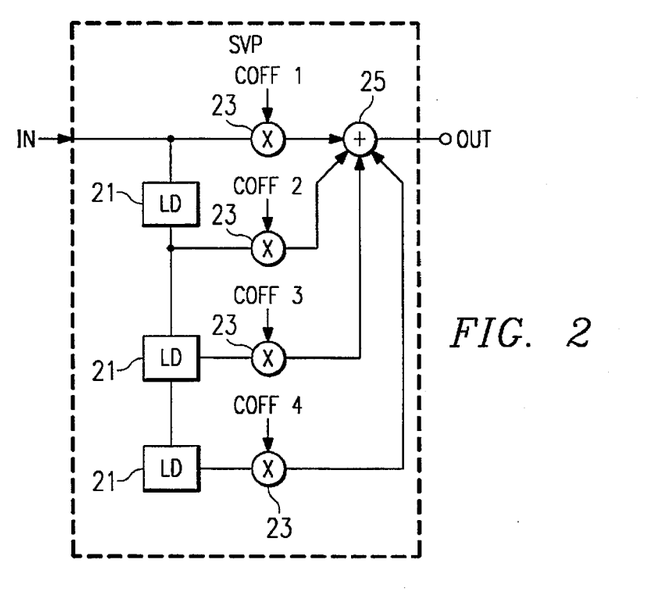
FIG. 2 illustrates scaling.

FIG. 2 illustrates how the input from four consecutive lines are summed to provide an output value for an output line as scaled. The first three (3) lines would be delayed in delays 21 so that the correct four input line signals would be summed at the same time. Each of the signals from the four lines would be multiplied by a coefficient in multiplier 23, and the multiplied signals are then summed in Adder 25 to get the signals at an output line. This may be done by hardware as illustrated in FIG. 2, for example, or may be done by a computer or scan line video processor under a program control with the multiplying and the summing done in the ALU (arithmetic logic unit) of the computer or processor. In accordance with the present invention, the method for designing the scaling filter is based on cubic interpolation. The general form of symmetric cubic filter is illustrated in the equation below.

$$k(x) = \begin{cases} P = |x|^3 + Q|x|^2 + R|x| = S & \text{if } |x| < 1 \\ T = |x|^3 + U|x|^2 + V|x| = W & \text{if } 1 < |x| \leq 2 \\ 0 & \text{otherwise} \end{cases}$$

By constraining the number of free parameters from 8 to 2, we get the following equation:

$$k(x) = (1/6) \begin{cases} (12 - 9B - 6C)|x|^3 + (-18 + 12B + 6C)|x|^2 + (6 - 2B) & \text{if } |x| < 1 \quad (1) \\ (-B - 6C)|x|^3 + (6B + 30C)|x|^2 + (-12B - 48C)|x| + (8B + 24C) & (2) \\ \quad \text{if } 1 \leq |x| < 2 \\ 0 & \text{otherwise} \end{cases}$$

Figure 3A:
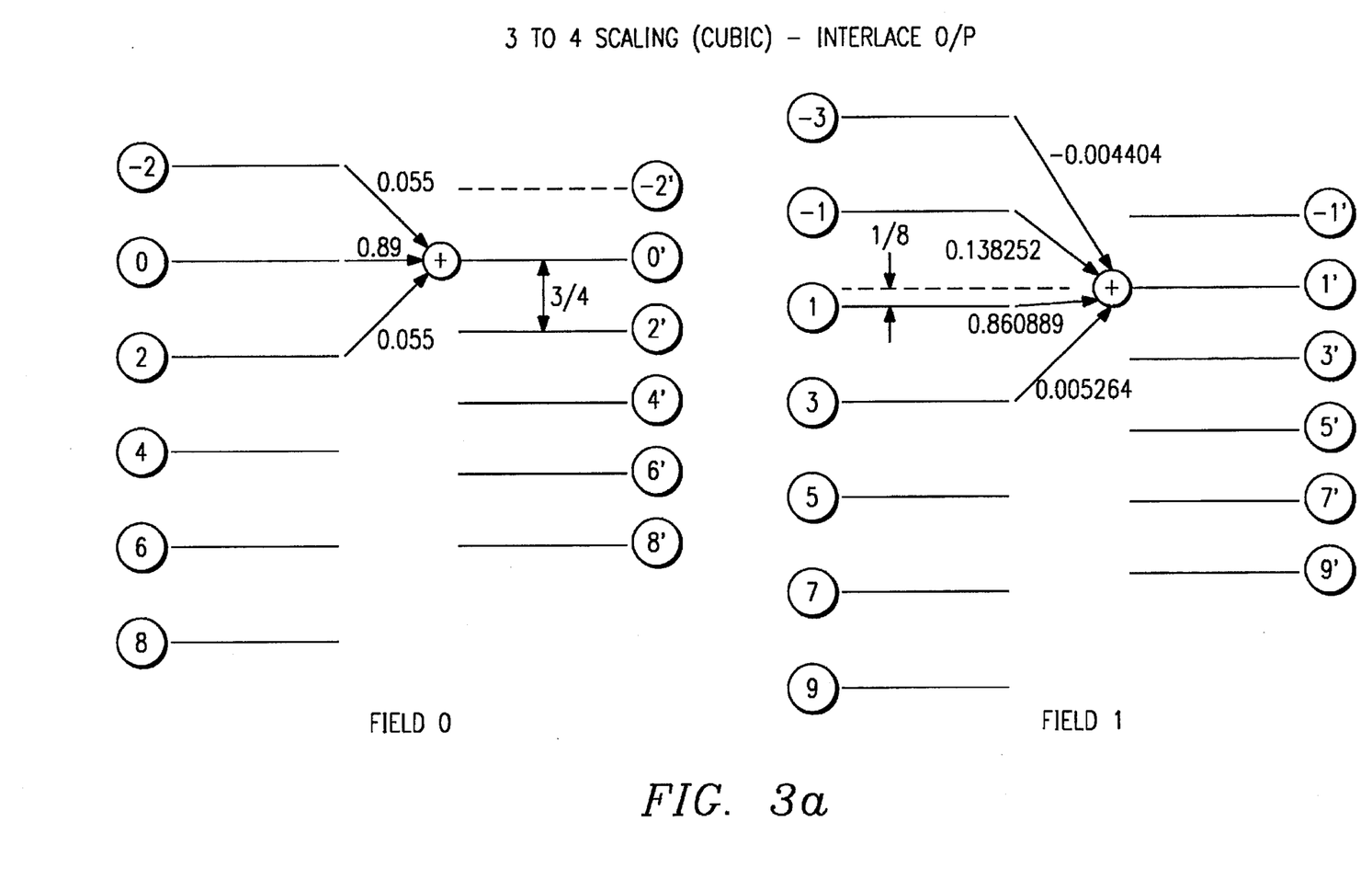
FIG. 3a–3d illustrates 3 to 4 scaling using cubic interpolation.
Figure 3B:
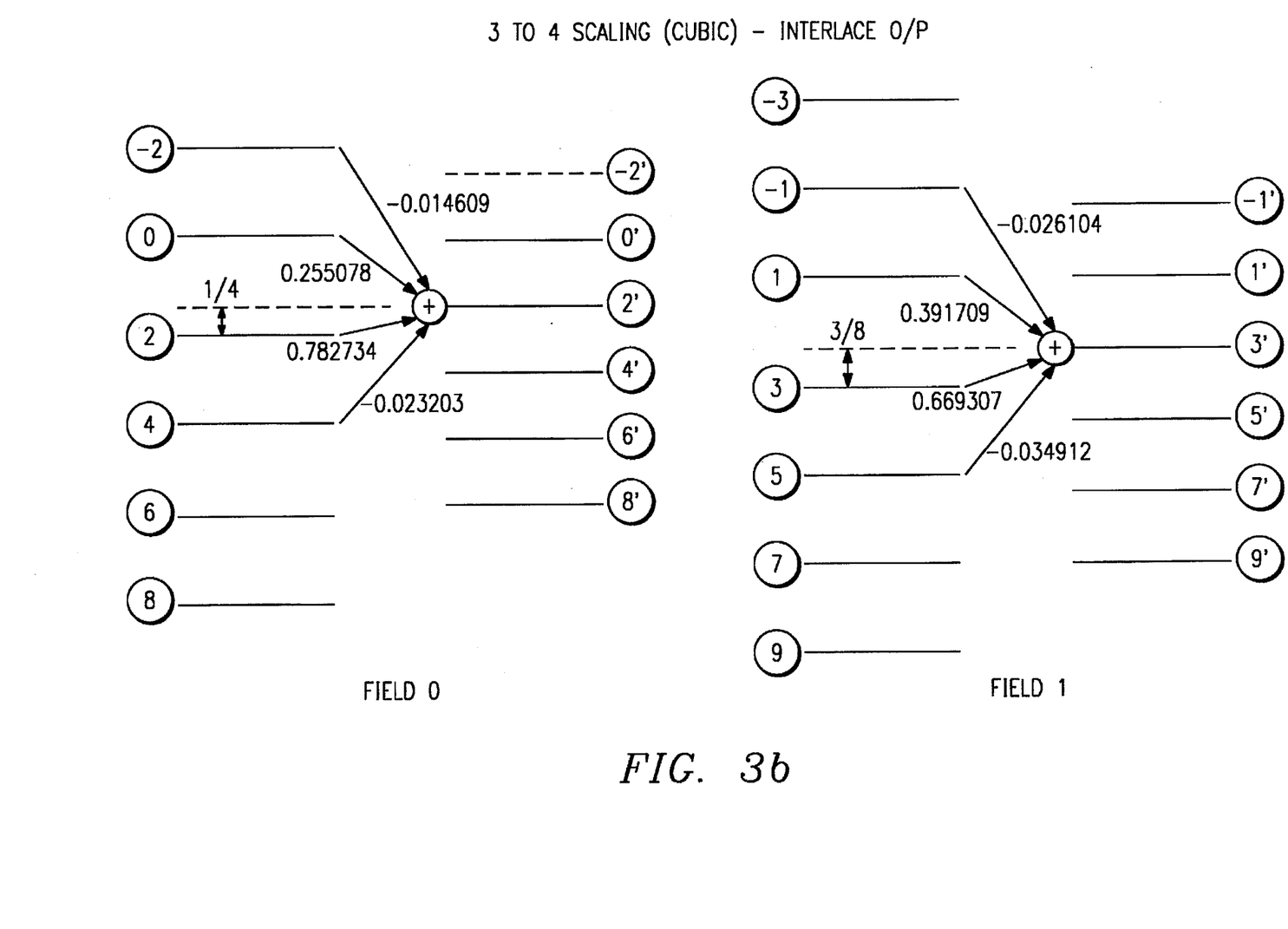

The parameters B and C are chosen for optimal response (optimal in terms of blurring, ringing, and angle dependent artifacts). The optimal value is B=C=⅓. The types of possible artifacts include anisotropy, which are angle dependent effects; blur, or smoothing of the edges; and ringing, which is ripple on the edges. The optimal cubic equation above is used to compute the filter coefficients for the specific example of 3 to 4 scaling as illustrated in FIG. 3. This figure shows the scaling of interlaced data so a different set of filter coefficients is required for each field. In FIG. 3a, the left side shows the even field (field 0), while the right side shows the odd field (field 1). In field 0, the input lines (before scaling) are shown as −2, 0, 2, 4, 6, and 8. The output lines (after scaling) are shown as −2', 0', 2', 4', 6', and 8'. According to the present invention, the distance of the output line from the four spatially nearest lines in the input is determined (cubic filters are four tap or less filters). These distances are then substituted as the value 'x' into the cubic equation above and the corresponding coefficient value is computed. These values are shown for a particular output line 0' in field 0 of FIG. 3a. Similarly, the coefficients for output line 1' of field 1 are shown in FIG. 3b. The equation computes a set of unique coefficients for each output line for each field (odd or even). The need to use different coefficients for odd and even fields arises because the data after scaling still needs to follow the interlaced format, namely, output lines 1', 3', 5', . . . need to be midway between lines 0', 2', 4' . . . Note that for field 0 the term 'x' between the output line 0' to the closest line 0 is 0 because they are aligned. This results in the coefficient of 0.89 for line 0 and 0.055 for line −2 and line +2. Since for input lines −4 or +4 x is 2, the coefficient value is 0. For Field 1, output line 1', line 1' is off by a line factor of ⅛ relative to line 1 and therefore the factor of 'x' is ⅛ and the corresponding 4 coefficients from lines −3, −1, 1, and 3 are the values indicated of −0.004404 for line −3, 0.138252 for line −1, 0.860889 for line 1, and 0.05264 for line 3.

Figure 4:
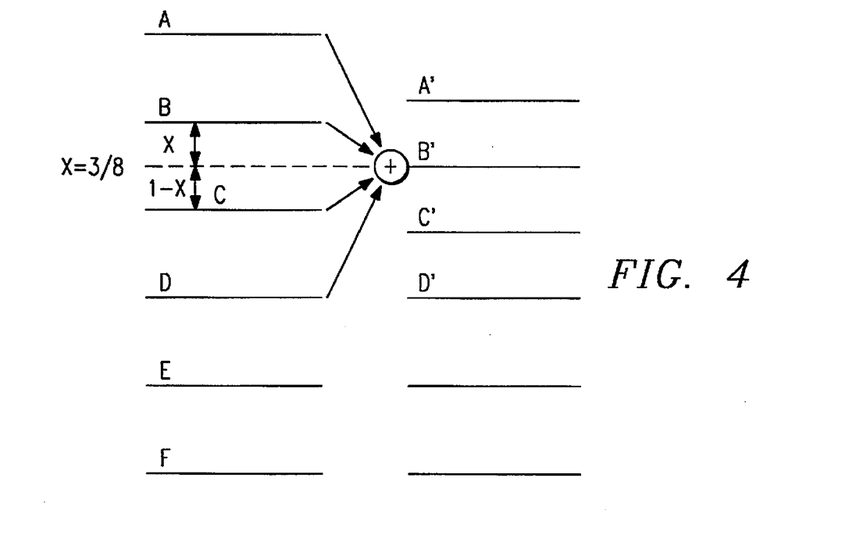
FIG. 4 illustrates interpolation.
Figure 5A:
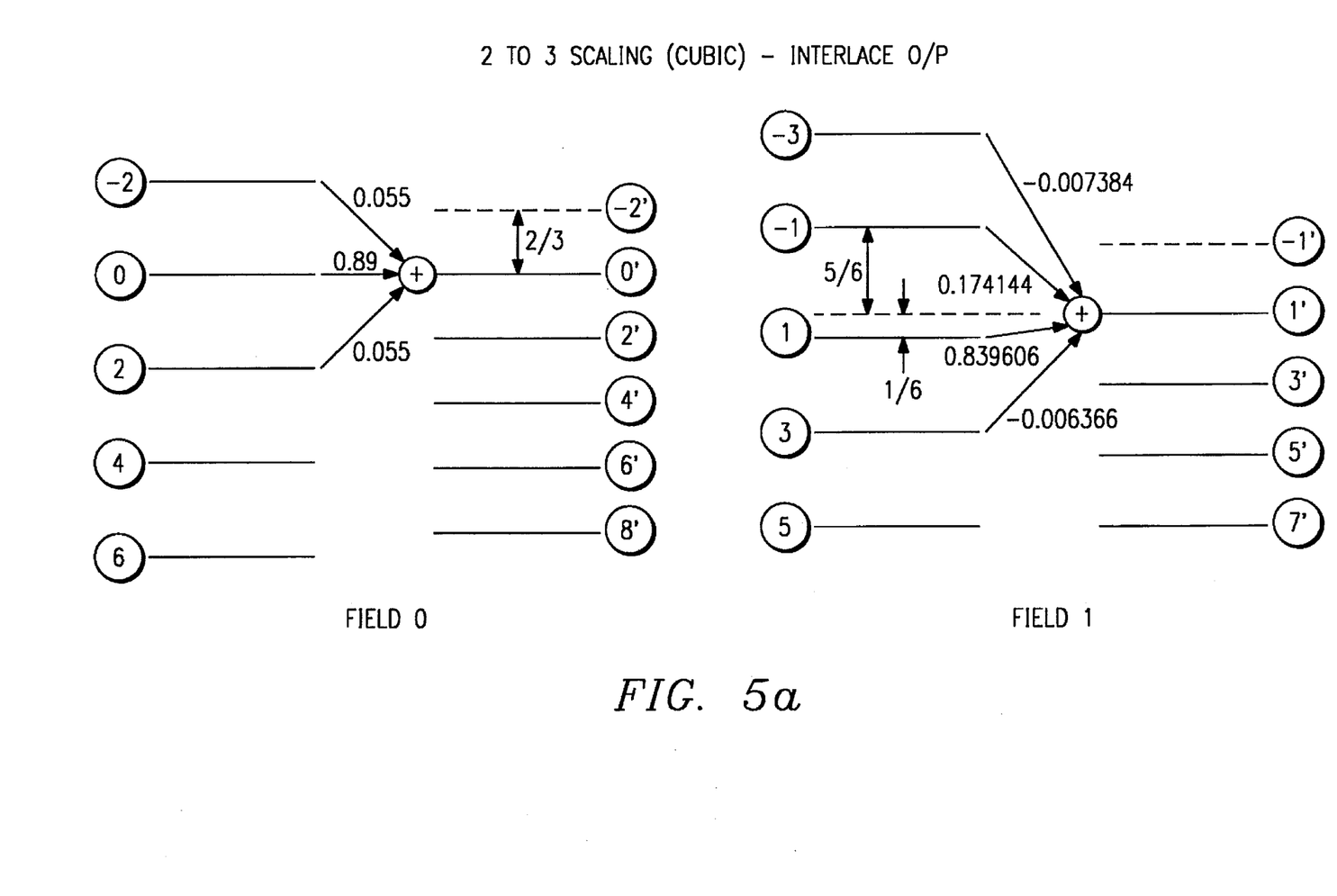
FIG. 5a–5c illustrates 2 to 3 scaling using cubic interpolation.
Figure 5B:
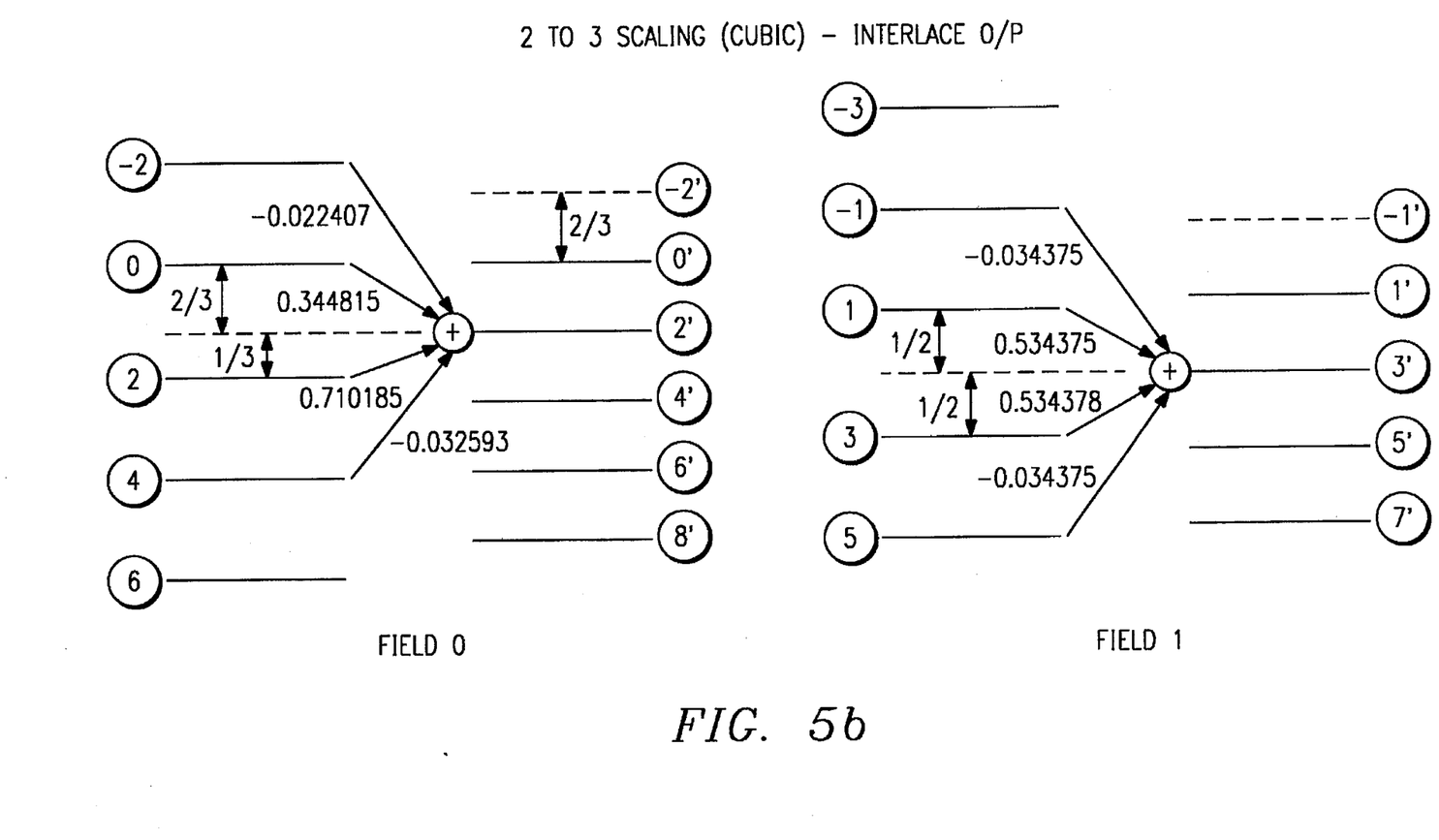

Referring to FIG. 4, there is illustrated how the lines are interpolated between the input lines and the output lines. The value of 'x' as illustrated is dependent upon the line distance of the closest input line to the output line. If they are aligned, as line 0 and 0' in FIG. 4a, the coefficient is 0.89, then if they are not aligned, as represented by 'x' in FIG. 5, line b is of a value of 'x', which is some fraction of 1 from output line b'. If the value of 'x' is ⅜ for line b in FIG. 5, the value of 'x' for input line is then entered into the cubic equation (1) stated above or:

$$\frac{(12 - 9B - 6C)|x|^3 + (-18 + 12B + 6C)|x|^2 + (6 - 2B) \text{ if } |x| < 1}{6} \quad (1)$$

where B and C are the parameters chosen for optimum response, which is ⅓. The next closest line c to line b' is 1−x, as represented in the FIG. 4. For FIG. 4, the distance of c from b' is x=⅝. The coefficient for line c in FIG. 5 is found using the previous equation (1) where x=⅝ since x is less than 1. The coefficient for a and d where x is between 1 and 2 uses:

$$\frac{(-B - 6C)|x|^3 + (6B + 30C)|x|^2 + (-12B - 48C)|x| + (8B + 24C)}{6}$$

Figure 3C:
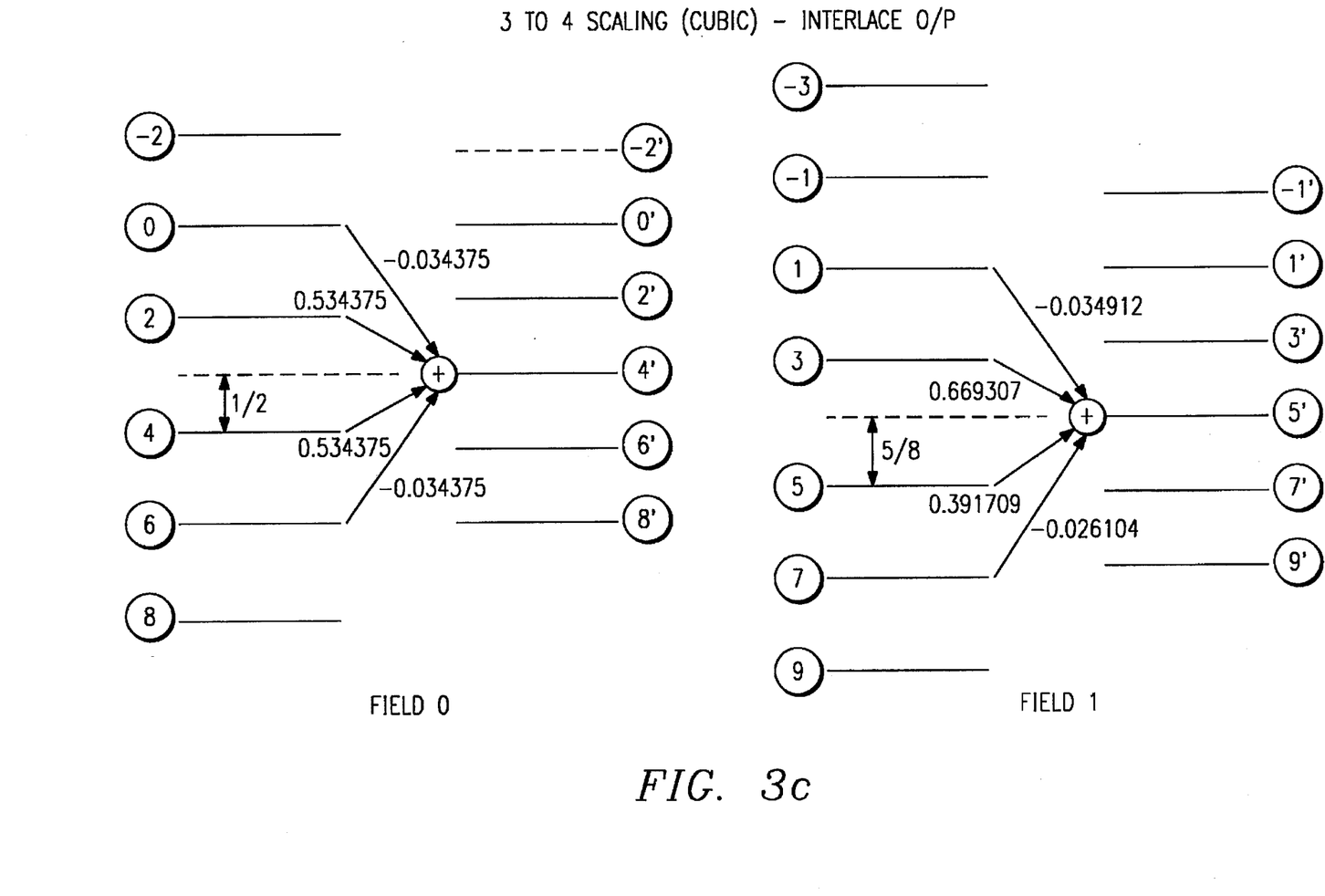
Figure 3D:
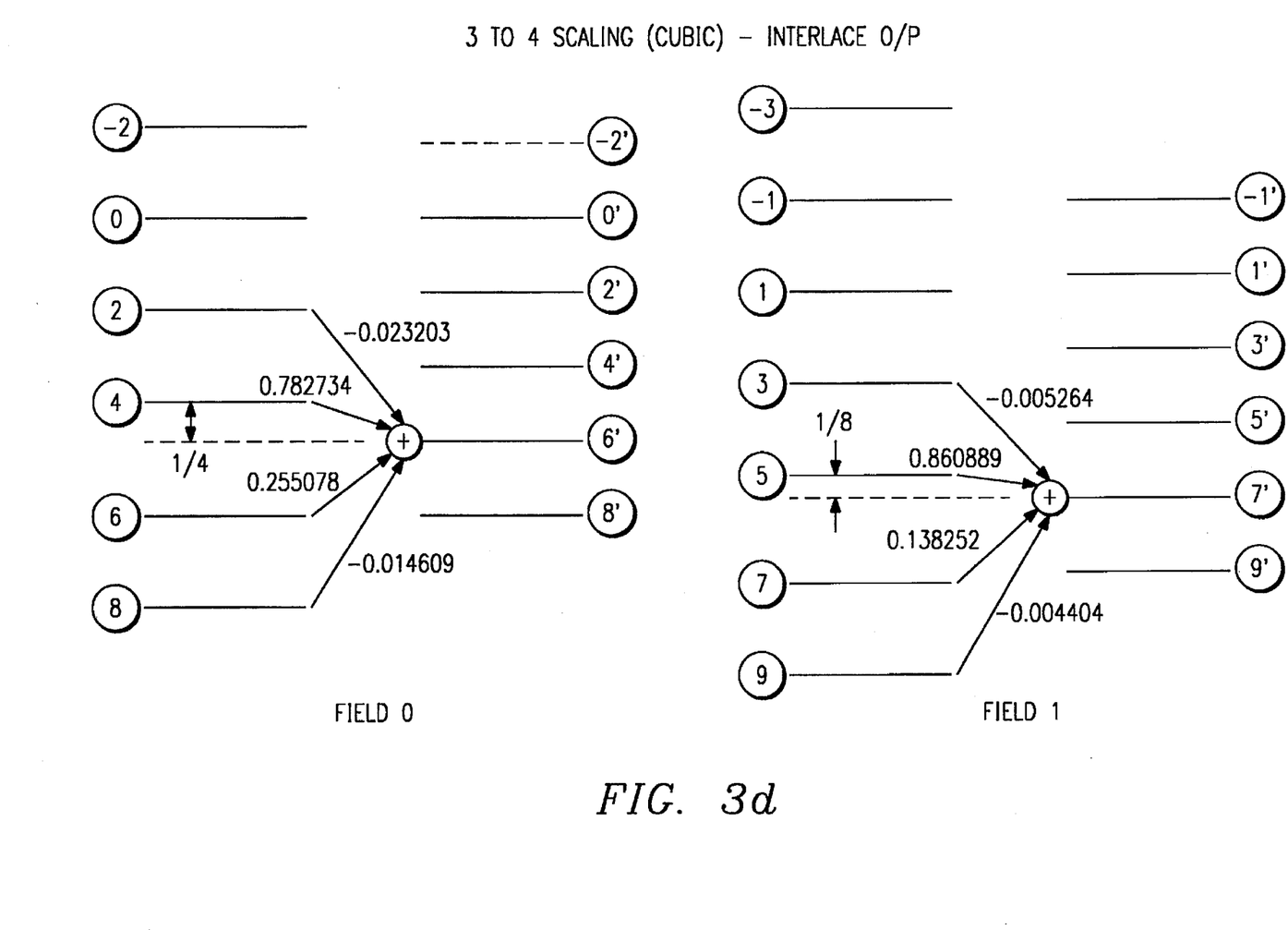

The next adjacent output line is c' determined by x distances from input lines b, c, d, and e.; the next output line d' uses distance from lines c, d, e, and f; and the following line e' uses d, e, f, and g. After the four output lines are determined, the next four output lines are determined by repeating the coefficients. The algorithm computes a set of unique coefficients for each output line for each field, both separately for odd and for even fields. In FIG. 3, odd lines are represented at the right as field 1, and even is represented by field 0. The need to use different coefficients for odd and even fields arises because the data after scaling still needs to follow the interlaced format, namely, output lines 1', 3', 5' . . . need to be midway between 0', 2', 4' . . . Turning again to the 3 to 4 scaling in FIG. 3a, and in particular to Field 1, x=⅛ for line 1 relative to line 1' and x=⅞ for line −1 relative to line 1'. These coefficients are determined using equation 1 and lines −3 and 3 are determined using equation 2. FIG. 3b is for output line 2' in field 0 and for output line 3' in field 1. The input values for line 2' is from input lines −2, 0, 2, and 4. The value for x=¼ and the closest input line is line 2, line 0 is 1 −¼ or ¾. The coefficients using equation (1) are 0.782734 for line 2 and 0.0255078 for line 0. The coefficients using equation (2) are −0.023203 for line 4 and −0.014609 for line −2. The input lines for line 3' (field 1) are lines −1, 1, 3, and 5. The closest line to 3' is line 3 where x=⅜. The coefficient for line 3 is 0.669307, for line 1 is 0.391709, for line −1 is −0.0076104 and for line 5 is −0.034912. The coefficients for lines 1 and 3 are from equation (1) and for lines −1 and 5 is from equation (2). FIG. 3c illustrates for output line 4' the input from lines 0, 2, 4, and 6 for field 0 where x=½, and for field I for output line 5' from input lines 1, 3, 5, and 7 where x is equal to ⅝. The coefficient for x=½ is 0.534375 for lines 2 and 4 using equation (1) and is −0.034375 for lines 0 and 6 using equation (2). The coefficient for line 5 where x=⅝ is 0.391709 using equation (1) and for line 3 where x=⅜ is 0.669307 using equation (1). For line 1 where x=1⅜, the coefficient is −0.034912 and for line 7 where x=1⅝ the coefficient is −0.026104 using equation (2). For line 6' at field 0, this is from input lines 2, 4, 6, and 8 and x is ¼ from line 4. See FIG. 3d. The coefficient for line 6 is 0.782734 using equation (1). For line 6, the coefficient for x=¾ is 0.255078. For line 2, the coefficient is −0.023203 using equation (2) and line 8, the coefficient is −0.014609 using equation (2). For field 1, line 5 is ⅛ from line 7' and therefore x is equal to ⅛ for the equation (1) to give 0.860889. Line 7 is 0.138252 using x=⅞. The coefficient of lines 3 and 7 are 0.005264 and 0.138252, respectively. The filter coefficients for the rest of the output lines are repeated, that is, for field 0 output line 8' the output would be that derived in FIG. 3a for 0'. The output for field 1, at line 9, would be like that from field 1 or from line 1' in FIG. 4a where the x is equal to ⅛ and the coefficients would be the same.

Figure 5C:
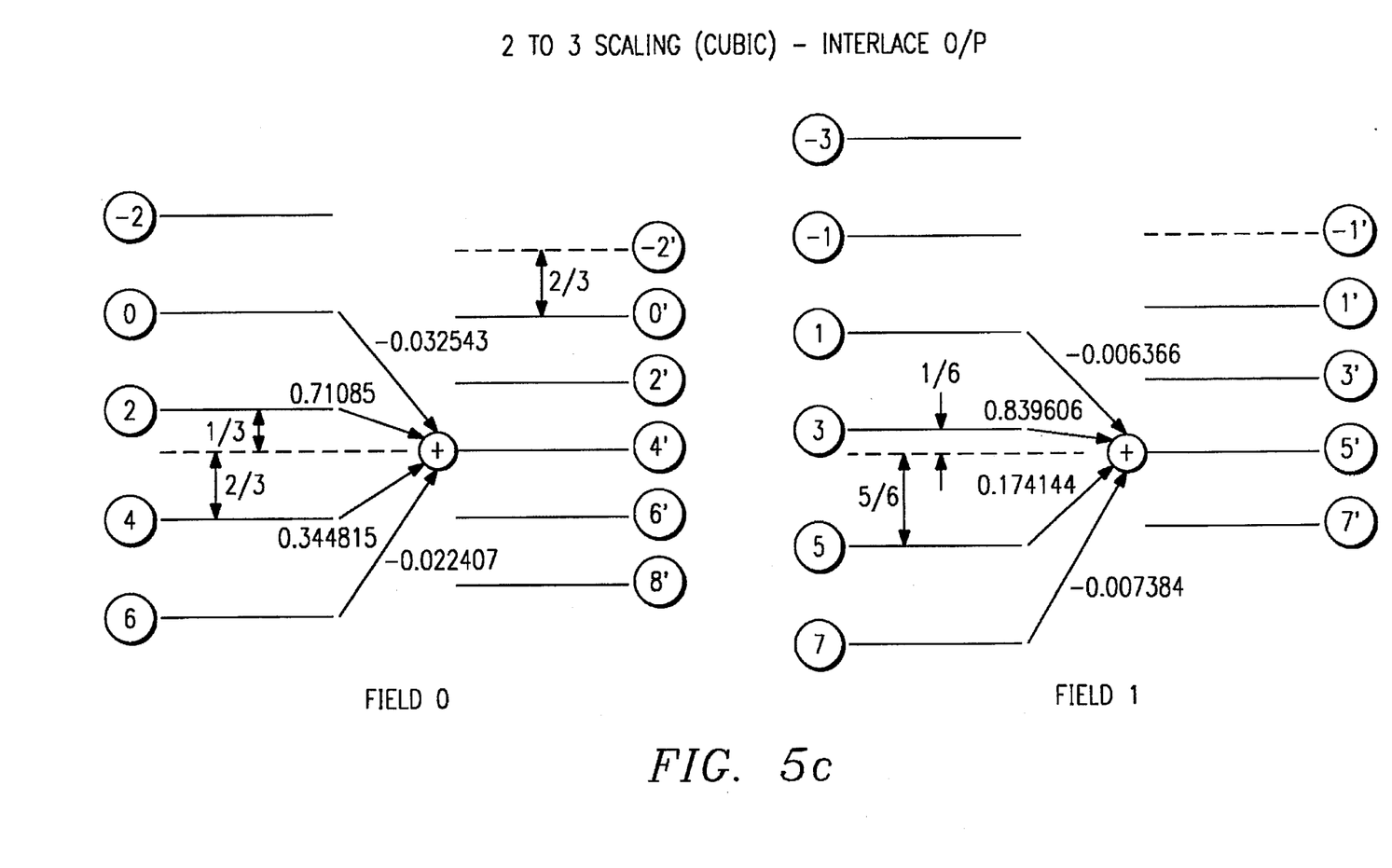

FIG. 6 shows a similar example for a 2 to 3 scaling filters according to the same method. In 2 to 3 scaling of FIG. 5a, the input lines −2, 0, and +2 are used to form the value of line 0' and in field 1 lines −3, −1, 1, and 3 are used to form the value in line 1' with x=0 being for field 0 and for field 1 x=⅙ from line 1 and the coefficients are 0.55, 0.89, and 0.55 for field 0 and −0.007384; 0.174144; 0.839606, and −0.006366 for field 1. For the next line and field 0 for output line 2' (FIG. 5b), the input coefficients are for input lines −2, 0, 2, and 4 with x for line 2 being ⅓ from line 2' and the coefficients for these input lines are −0.022407; 0.344815; 0.710185, and −0.032593. For field 1, the output line 3' is ½ off from input line 3 and line 1, so x is equal to ½ for lines 1 and 3, and accordingly the proportionate coefficients for lines −1, 1, 3 and 5, are respectively, −0.034375, 0.534375; 0.534375; and 0.034375. FIG. 5c, shows for line 4' the coefficients for lines 0, 2, 4, and 6 with input line 4 being ⅔ from output line 4' and the coefficients are respectively, −0.032593 for line 0; 0.71085 for line 2; 0.344815 for line 4; and −0.22407 for line 6. For field 1, line 5 which from line 5' is ⅚ (x=⅚), the coefficients for lines 1, 3, 5, and 7 are respectively, −0.006366; 0.839606; 0.174144; and −0.007384. For line 6' field 0, the coefficients for the corresponding lines repeat what was shown in FIG. 5a for field 0 and for line 7' field 1, the coefficients repeat what was shown for line 1' from FIG. 5a.

The above explanation pertaining to scaling of interlaced data, which is useful in the following situations: interlaced display (CRTs, possible DMD interlace display), line double on output display, or progressive scan following scaling. This method is also suitable for designing scaling filters for progressive scan rate data. In this case, there is no need to use separate filters for the odd and even fields because each frame of the progressive scan data has video lines at the same spatial locations. The design methodology is essentially the same as described above, except for the lack of field variation.

The coefficients for performing one vertical interpolation for a 9:10 cubic interpolation, which come from the same equations (1) and (2) are shown below.

Line 0=0.055 A+0.89 B+0.055 C

Line 1=−0.002915 A+0.118475 B+0.871075 C+0.013365 D

Line 2=−0.01012 B+0.205200 C+0.819 D−0.01408 E

Line 3=−0.019305 C+0.308125 D+0.740825 E−0.029645 F

Line 4=−0.02816 D+0.4202 E+0.6436F−0.03564 G

Line 5=−0.034375 E+0.534375 F+0.534375 G−0.034375 H

Line 6=−0.03564 F+0.6436 G+0.4202 H−0.02816I

Line 7=−0.029645 G+0.740825 H+0.308125 I−0.019305J

Line 8=−0.014080 H+0.819000 I+0.2052 J−0.010120 K

Line 9=−0.013365 I+0.871975 J+0.118475 K−0.002915 L

Line 10=0.055 J+0.89 K+0.055 L (Beginning of next set) where A, B . . . L are input lines (before scaling) and 0, 1 . . . 9 are output lines after scaling.

Cubic scaling filters for various scale factors (3 to 4, 2 to 3, and 9 to 10) have been developed using this method and have been implemented in a scan/line video processor for real time operation. A relative comparison of the number of SVP instructions required to implement bilinear and cubic filters for 3 to 4 scaling is illustrated in Table 1 below.

TABLE 1

| Output Line | Bilinear | Cubic |
| --- | --- | --- |
| 1 | 8 | 110 |
| 2 | 37 | 143 |
| 3 | 24 | 149 |
| 4 | 37 | 143 |

In the preferred embodiment, this algorithm is implemented on a real time hardware, such as TIs SVP (scan/line video processor). Appendix A attachment includes the SVP pseudo code for 2 to 3 scaling.

Figure 6A:
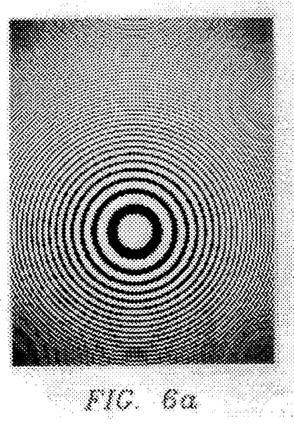
FIG. 6a–6c illustrates results of cubic interpolation.
Figure 6B:
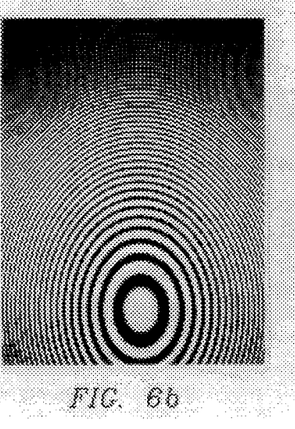
Figure 6C:
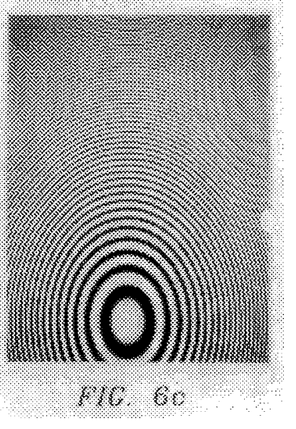

The image shown in FIG. 6a is a circular zone plate, a standard test image used to test quality of image interpolation methods. Note the significant aliasing at the top of the picture (high spatial frequency region) introduced by the bilinear interpolation in FIG. 6b and reduced by the cubic interpolation in FIG. 6c according to the present invention.

While the above explanations have pertained to scaling lines of video data (i.e., converting vertical scaling $n_1$ lines of data to $n_2$ lines), the technique is also applicable to scaling the number of pixels on a given video horizontal scaling line. In scaling the width, the input pixels are compared to the adjacent pixels on a line. Therefore in the configuration of FIG. 2 the delays are very short pixel element spacings with the earliest closest pixel within two pixel distances from the output pixel being at the bottom line. The multiplication coefficient value based on cubic interpolation for the closest pixels using the pixel space distance for "x" and the same equation 1 for less than 1 pixel space from the output pixel and equation 2 if greater than 1 and less than 2 pixel spaces and further where B=C=⅓.

It will be appreciated by those skilled in the art that changes and variations in the embodiments described herein can be made without departing from the spirit and scope of the present invention as defined by the following claims.

APPENDIX A

Cubic_2:3 CSU processing generates vertically scaled images, where weighted pixel values of the current and surrounding lines are used to calculate the interpolated video lines. Processing shall produce a new line for every 2 original video lines. The following table describes the Cubic_2:3 CSU utilization of local data.

| IDENTIFIER | DESCRIPTION | REPRESEN-TATION | MEMORY MAP | APPLICABLE CSU |
|---|---|---|---|---|
|  | Fractional component for calculation of variable CRNT | 2 bit - 2's compliment Integer | RF1 bits 0..1 | Cubic_2:3 |
| CRNT | Input value for current line used to compute scaling components | 11 bit - 2's compliment Integer | RF1 bits 2..12 | Cubic_2:3 |
|  | Fractional component for calculation of variable DRVD | 2 bit - 2's compliment Integer | RF1 bits 13..14 | Cubic_2:3 |
| DRVD | Input value for derived line used to compute scaling components | 11 bit - 2's compliment Integer | RF1 bits 15..25 | Cubic_2:3 |
| HALF | Constant = -0.5 for rounding up if positive or down if negative | 2 bit - 2's compliment Integer | RF1 bits 26..27 | Cubic_2:3 |
|  | Fractional component for calculation of variable L0 | 2 bit - 2's compliment Integer | RF0 bits 0..1 (GRL0 data) | Cubic_2:3 |
| L0 | Value of line 0 | 12 bit - 2's compliment Integer | RF0 bits 2..13 (GRL0 data) | Cubic_2:3 |
|  | Fractional component for calculation of variable L1 | 2 bit - 2's compliment Integer | RF0 bits 14..15 (GRL0 data) | Cubic_2:3 |
| L1 | Value of line 1 | 12 bit - 2's compliment Integer | RF0 bits 16..27 (GRL0 data) | Cubic_2:3 |
|  | Fractional component for calculation of variable L2 | 2 bit - 2's compliment Integer | RF0 bits 28..29 (GRL0 data) | Cubic_2:3 |

| L2 | Value of line 2 | 12 bit - 2's compliment Integer | RF0 bits 30..41 (GRL0 data) | Cubic_2:3 |
|---|---|---|---|---|
| | Fractional component for calculation of variable L3 | 2 bit - 2's compliment Integer | RF0 bits 42..43 (GRL0 data) | Cubic_2:3 |
| L3 | Value of line 3 | 12 bit - 2's compliment Integer | RF0 bits 44..55 (GRL0 data) | Cubic_2:3 |
| | Fractional component for calculation of variable L4 | 2 bit - 2's compliment Integer | RF0 bits 56..57 (GRL0 data) | Cubic_2:3 |
| L4 | Value of line 4 | 12 bit - 2's compliment Integer | RF0 bits 58..69 (GRL0 data) | Cubic_2:3 |
| | Fractional component for calculation of variable L5 | 2 bit - 2's compliment Integer | RF0 bits 70..71 (GRL0 data) | Cubic_2:3 |
| L5 | Value of line 5 | 12 bit - 2's compliment Integer | RF0 bits 72..83 (GRL0 data) | Cubic_2:3 |
| | Fractional component for calculation of variable L6 | 2 bit - 2's compliment Integer | RF0 bits 84..85 (GRL0 data) | Cubic_2:3 |
| L6 | Value of line 6 | 12 bit - 2's compliment Integer | RF0 bits 86..97 (GRL0 data) | Cubic_2:3 |
| | Unused bits to line up GRL0 104 bit boundary | 6 bit - unused | RF0 bits 98..103 (GRL0 data) | |
| | Fractional component for calculation of variable L2R | 2 bit - 2's compliment Integer | RF0 bits 90..91 (GRL0 data) | Cubic_2:3 |
| L2R | Vaused to pick up rotated line 2 value | 12 bit - 2's compliment Integer | RF0 bits 92..103 (GRL0 data) | Cubic_2:3 |
| TEMP | Copy of value used in computing scaling components | 10 bit - 2's compliment Integer | RF0 bits 104..113 | Cubic_2:3 |

Pseudocode for the Cubic_2:3 CSU is as follows:

```
Wait for HSYNC                              ;HSYNC: JFAZ $
;
; update mode register
XTRA_PAIR = PTC IMODE                       ;       UMR
;
IF XTRA_PAIR = 1 THEN                       ;       JME OUT12, 0
  ; write out 2 video lines
  SVP2_VIDEO_OUT.VIDEO_REAL = L0            ;       OUT0 0, L0, 10
  SVP2_VIDEO_OUT.VIDEO_DRVD = L1            ;       OUT0 10, L1, 10
  ; otherwise, 2 pair will be output, one
  ; now and one in the middle of the cycle
ELSE                                        ;       JMP OUT01:
                                            ;OUT12:
  SVP2_VIDEO_OUT.VIDEO_REAL = L1            ;       OUT0 0, L1, 10
  SVP2_VIDEO_OUT.VIDEO_DRVD = L2            ;       OUT0 10, L2, 10
ENDIF                                       ;OUT01:
;
; shift positions of data in RF0 line calculations
; may continue
L2R = L2                                    ;       GRL0
L0 = L3
L1 = L4
L2 = L5
L3 = L6
;
; read in values for current and derived pixels
CRNT = SVP2_VIDEO_IN.VIDEO_REAL             ;       INP1 CRNT, 0, 10
DRVD = SVP2_VIDEO_IN.VIDEO_DRVD             ;       INP1 DRVD, 10, 10
;
; copy the value of current line to temp
TEMP = CRNT                                 ;       MOV01 TEMP, CRNT, 10
;
; calculate -0.022407 x CRNT = -3/128
CRNT = TEMP / 128                           ;       MOV10 CRNT-2, TEMP+5, 5
CRNT = CRNT - TEMP / 32                     ;       SBS110 CRNT-2, TEMP+3, 5, 7
; add the component to Line 0
L0 = L0 + CRNT                              ;       ADS001 L0-2, CRNT-2, 12, 7
; round up the value of completed Line 0
IF L0 >= 0 THEN                             ;       ADCS00 L0-1, HALF, 12, 2,
  L0 = L0 + 1/2                             ;         L0+10
ELSE
  L0 = L0 - 1/2
ENDIF
; clip -512 <= L0 <= 511
```

```
L0 = CLIP(L0)                                  ;    CLPBT00 L0, 10, 11
; initialize Line 5
L5 = CRNT                                      ;    MOV01 L5-2, CRNT-2, 7
;
; calculate 0.055 x CRNT = 7/128
CRNT = -TEMP / 128                             ;    CMP110 CRNT-2, TEMP+5, 5, 1
CRNT = CRNT + TEMP / 16                        ;    ADS110 CRNT-2, TEMP+2, 6, 8
; add the component to Line 1
L1 = L1 + CRNT                                 ;    ADS001 L1-2, CRNT-2, 12, 8
; round up the value of completed Line 1
IF L1 >= 0 THEN                                ;    ADCS00 L1-1, HALF, 11, 2,
   L1 = L1 + 1/2                               ;       L1+9
ELSE
   L1 = L1 - 1/2
ENDIF
; clip -512 <= L1 <= 511
L1 = CLIP(L1)                                  ;    CLPBT00 L1, 10, 11
; initialize Line 4
L4 = CRNT                                      ;    MOV01 L4-2, CRNT-2, 8
;
; calculate 0.710185 x CRNT = 91/128
CRNT = -TEMP / 128                             ;    CMP10 CRNT-2, TEMP+5, 5, 1
CRNT = CRNT - TEMP / 32                        ;    SBS110 CRNT-2, TEMP+3, 6, 7
CRNT = CRNT - TEMP / 4                         ;    SBS110 CRNT-2, TEMP, 8, 10
CRNT = CRNT + TEMP                             ;    ADS110 CRNT, TEMP, 9, 10
; add the component to Lines 2 and 3
L2 = L2 + CRNT                                 ;    ADS001 L2-2, CRNT-2, 11, 12
L3 = L3 + CRNT                                 ;    ADS001 L3-2, CRNT-2, 8, 12
;
; if this is not a cycle generating an extra line
; pair for output, jump over
IF XTRA_PAIR = 0 THEN DO NOTHING               ;    JME CONT, 0
   ; otherwise, the extra pair is ready for output
   ELSE
   Wait for SYNC                               ;    JFBZ $
   ; write out the pair
   SVP2_VIDEO_OUT.VIDEO_REAL = L6              ;    OUT0 0, L6, 10
   SVP2_VIDEO_OUT.VIDEO_DRVD = L0              ;    OUT0 10, L0, 10
ENDIF                                          ;CONT:
;
; copy the value of the derived line to temp
TEMP = DRVD                                    ;    MOV01 TEMP, DRVD, 10
;
; calculate -0.032593 x DRVD = -4/128
```

```
DRVD = -TEMP / 32                       ;   CMP10 DRVD-2, TEMP+3, 7, 1
; add the component to Line 2
L2 = L2 + DRVD                          ;   ADS001 L2-2, DRVD-2, 13, 8
; round up the value of completed Line 2
IF L2 >= 0 THEN                         ;   ADCS00 L2-1, HALF, 12, 2,
   L2 = L2 + 1/2                        ;   L2+10
ELSE
   L2 = L2 - 1/2
ENDIF
; clip -512 <= L2 <= 511
L0 = CLIP(L2)                           ;   CLPBT00 L2, 10, 11
; initialize Line 6
L6 = DRVD                               ;   MOV01 L6-2, DRVD-2, 8
;
; calculate 0.344815 x DRVD = 44/128
DRVD = TEMP / 32                        ;   MOV10 DRVD-2, TEMP+3, 7
DRVD = DRVD + TEMP / 16                 ;   ADS110 DRVD-2, TEMP+2, 7, 8
DRVD = DRVD + TEMP / 4                  ;   ADS110 DRVD-2, TEMP, 9, 10
; add the component to Lines 3 and 5
L3 = L3 + DRVD                          ;   ADS001 L3-2, DRVD-2, 12, 11
L5 = L5 + DRVD                          ;   ADS001 L5-2, DRVD-2, 7, 11
;
; calculate 0.89 x DRVD = 114/128
DRVD = TEMP / 64                        ;   MOV10 DRVD-2, TEMP+4, 6
DRVD = DRVD - TEMP / 8                  ;   SBS110 DRVD-2, TEMP+1, 6, 9
DRVD = DRVD + TEMP                      ;   ADS110 DRVD, TEMP, 7, 10
; add the component to Line 4
L4 = L4 + DRVD                          ;   ADS001 L4-2, DRVD-2, 8, 12
;
JUMP TO START                           ;   JMP HSYNC
```

What is claimed is:

1. A method of providing a video scaling filter in a video interlace system with odd and even fields such that a first plurality of video input lines is converted to a second plurality of video output lines comprising the steps of:

determining the line space distance of each of the closest odd field input lines to a given one of said odd field output lines that are less than two odd field line spaces from the odd field output line;

computing a first coefficient value for each of said closest odd field input lines according to cubic interpolation using said line space distances less than two line spaces from said given one of said odd field output lines;

multiplying said closest odd field input lines by said first coefficient value for that closest odd field input line to provide signals representing first coefficient weighted odd field input line values;

combining said signals representing first coefficient weighted odd field input line values closest to said given one of said odd field output lines to form said given one of said odd field output lines;

determining the line space distance of each of the closest even field input lines to a given one of said even field output lines that are less than two even field line spaces from the even field output line;

computing a second coefficient value for each of said closest even field input lines according to cubic interpolation using said line space distances less than two line spaces from said given one of said even field output lines;

multiplying said closest even field input lines by said second coefficient value for that closest even field input line to provide signals representing second coefficient weighted even field input line values; and combining said signals representing second coefficient weighted even field input line values closest to said given one of said even field output lines to form said given one of said even field output lines.

2. The method of claim 1 wherein said computing a first coefficient value and said computing a second coefficient value provides coefficient values according to:

$$\frac{(12-9B-6C)|x|^3 + (-18+12B+6C)|x|^2 + (6-2B)}{6} \text{ if } |x| < 1$$

$$\frac{(-B-6C)|x|^3 + (6B+30C)|x|^2 + (-12B-48C)|x| + (8B+24C)}{6} \text{ if } 1 \leq |x| < 2$$

where x equals the line distance between the input pixel and an output pixel and is less than two and B and C are parameters chosen for minimum blurring ringing and angle dependent artifacts.

3. A video image scaling filter for converting a first plurality of video input lines to a second plurality of video output lines where said video input and output lines are interlaced for odd and even fields comprising:

means for determining for each odd filed lines the line space distance of each of the closest odd input field lines to a given one of said odd field output lines that are less than two odd field line spaces from the odd output field line;

means for computing a first coefficient value for each of said closest input odd field lines according to cubic interpolation of said odd field lines using said odd line length distances that are less than two odd line spaces from said odd output line;

means for multiplying each of said closest odd input lines by said first coefficient value for that closest odd input lines to provide a first signal representing a first coefficient weighted value for said odd field input line;

means for combining said first signal representing a first coefficient weighted value from said closest odd input lines to form said given one of said odd field output lines;

means for determining the line space distance of each of the closest even field lines to a given one of said even field output lines that are less than two even field line spaces from the even output field line;

means for computing a second coefficient value for each of said closest input even field lines according to cubic interpolation of said even field lines using said even line length distances that are less than two even line spaces from said even output line;

means for multiplying each of said closest even input lines by said second coefficient value for that closest even input line to provide second signals representing a second coefficient weighted value for said even field input line; and means for combining said second signals representing a second coefficient weighted value from said closest even input lines to form said given one of said even field video output lines.

* * * * *